US011794608B1

(12) United States Patent
Morales (10) Patent No.: US 11,794,608 B1
(45) Date of Patent: Oct. 24, 2023

(54) THIRD RAIL POWER INSULATING SYSTEM (71) Applicant: Eastern Rail Corp., Hialeah, FL (US)

(72) Inventor: Miguel Angel Morales, Hialeah, FL (US)

(73) Assignee: Eastern Rail Corp., Hialeah, FL (US)

( * ) Notice: Subject to any disclaimer, the term of this patent is extended or adjusted under 35 U.S.C. 154(b) by 182 days.

(21) Appl. No.: 17/529,648

(22) Filed: Nov. 18, 2021

(51) Int. Cl.
  *B60M 1/04* (2006.01)
  *B60M 1/30* (2006.01)

(52) U.S. Cl.
  CPC .............. *B60M 1/04* (2013.01); *B60M 1/307* (2013.01)

(58) Field of Classification Search
  CPC .......... B60M 1/04; B60M 1/307; B60M 1/30; B60M 1/20; B60M 5/00
  See application file for complete search history.

(56) References Cited

U.S. PATENT DOCUMENTS

| 3,475,568 | A | * | 10/1969 | Dehn ....................... B60M 1/04 191/35 |
| 3,575,576 | A | * | 4/1971 | Harmsen ................. B60M 1/04 191/32 |
| 3,735,845 | A | * | 5/1973 | Harmsen ................. B60M 1/307 191/32 |
| 3,927,742 | A | * | 12/1975 | Reynolds ................. B60M 1/04 191/30 |
| 4,318,462 | A | * | 3/1982 | Weinhaus ................ B60M 1/30 191/32 |
| 7,926,634 | B1 | * | 4/2011 | Morales .................. B60M 1/307 191/32 |
| 2019/0351641 | A1 | * | 11/2019 | Massey, Jr. ............ B62D 29/04 |

* cited by examiner

*Primary Examiner* — Mark T Le
(74) *Attorney, Agent, or Firm* — Albert Bordas, P.A.

(57) ABSTRACT

A third rail power insulating system, which has a cover board assembly having a support bracket assembly, cover board assembly retaining clips, a side cover board, and a top cover board. The support bracket assembly has a top wall, at least two pairs of top bracket holes with top threads, top bolt supports, a lateral wall, at least three pairs of lateral bracket holes with lateral threads, lateral bolt supports, internal walls, internal reinforcement walls, and a central wall. The side cover board has a plate having a plate top edge and a plate bottom edge, first and second lateral holes, and first and second lateral bolts. The top cover board has an elongated plate, a bottom face having hexagonal cells, first and second top holes, first and second top bolts, and an elongated lip.

20 Claims, 4 Drawing Sheets

THIRD RAIL POWER INSULATING SYSTEM

BACKGROUND OF THE INVENTION

1. Field of the Invention

The present invention relates to insulating systems, and more particularly, to third rail power insulating systems.

2. Description of the Related Art

Elevated rapid transit systems comprise a contact rail system that is typically installed on an at-grade track and on aerial guideway supporting trackwork. The height of the contact rail system on the aerial guideway is typically 40' above surrounding ground, and at some locations can range up to 75' above the surrounding ground.

Applicant believes that one of the closest references corresponds to U.S. Pat. No. 7,926,634 issued to Applicant's own Miguel Angel Morales on Sep. 3, 2008 for Third rail power insulating system. However, it differs from the present invention because Morales teaches a third rail power insulating system, comprising an insulator assembly and a cover board assembly. The insulator assembly comprises pedestal-supporting insulators that are mounted onto a contact rail assembly. The insulator assembly further comprises an insulator anchor bolt assembly, a base shim plate, a bolt assembly, a lubricating shim, and retaining clips. The cover board assembly is also mounted onto the contact rail assembly and it comprises a support bracket assembly, retaining clips, a side cover board, and a top cover board. The support bracket assembly has a general C-shape and comprises a lateral wall, a top wall, a base wall, and a protrusion. The side cover board comprises an elongated plate having at least one hole, and the top cover board comprises an elongated plate having sufficient curvature to contour the support bracket assembly.

Other patents describing the closest subject matter provide for a number of more or less complicated features that fail to solve the problem in an efficient and economical way. None of these patents suggest the novel features of the present invention.

SUMMARY OF THE INVENTION

The present invention is a third rail power insulating system, comprising a cover board assembly. The cover board assembly comprises a support bracket assembly, cover board assembly retaining clips, a side cover board, and a top cover board.

The support bracket assembly has a top wall, at least two pairs of top bracket holes with top threads, top bolt supports, a lateral wall, at least three pairs of lateral bracket holes with lateral threads, lateral bolt supports, internal walls, internal reinforcement walls, and a central wall. The cover board assembly retaining clips comprises a wall, an arm, a through hole, a channel, an edge, and a bolt. The side cover board comprises a plate having a plate top edge and a plate bottom edge, first and second lateral holes, and first and second lateral bolts. The top cover board comprises an elongated plate, a bottom face having hexagonal cells, first and second top holes, first and second top bolts, and an elongated lip.

The side cover board and the top cover board are mounted onto the support bracket assembly, whereby the first and second lateral bolts pass through the first and second lateral holes to be threaded into the respective lateral threads, and the first and second top bolts pass through the first and second top holes to be threaded into the top threads. The cover board assembly is mounted onto a contact rail assembly. Each top bolt support and each lateral bolt support is positioned around respective top bracket hole and respective lateral bracket hole, whereby the top brackets holes and the lateral bracket holes extend through the top bolt supports and the lateral bolt supports respectively. The top bolt supports and the lateral bolt supports are positioned at an inner side of the top wall and an inner side of the lateral wall respectively. The internal reinforcement walls extend from the central wall to respective lateral wall and top wall, whereby the internal reinforcement walls are in a zigzag configuration. The internal walls extend from the base wall to a base top face, whereby the internal walls are perpendiculars to the base wall and the base top face.

The first and second top bolts each comprise a plain portion and a threaded portion whereby the plain portion remains inside respective first and second top holes, and respective top threads receive the threaded portion. The first and second lateral bolts each comprise a plain portion and a threaded portion, whereby the plain portion remains inside respective first and second lateral holes, and respective lateral threads receive the threaded portions. The plate is mounted to the lateral wall wherein the first and second lateral bolts are positioned onto the two upper lateral bracket holes, whereby the elongated lip relatively mounts onto the plate top edge defining a closed configuration of the cover board assembly. The plate is mounted to the lateral wall wherein the first and second lateral bolts are positioned onto the two lowers lateral bracket holes, whereby a cavity is defined between the top cover board and the side cover board defining an open configuration of the cover board assembly. The hexagonal cells extend over a complete area of the bottom face. The base wall comprises lateral base walls and a central base wall between the lateral base walls.

The support bracket assembly has a general C-shape and further comprises an upper end, a lower end, a protrusion, a protrusion end, and at least one cutout defining a channel to allow a second water runoff and prevent a second water stream from making contact onto the contact rail assembly. The lower end comprises an end hole and a lip. The cover board assembly retaining clip is mounted onto the lower end, whereby the channel receives the lip, and the bolt passes through the through hole to be threaded into the end hole. The top cover board comprises an elongated plate having sufficient curvature to contour the upper portion of the support bracket assembly.

The present invention further comprises an insulator assembly, which has supporting insulators. The insulator assembly is mounted onto a single molded pedestal that is part of a track guideway. The insulator assembly supports the contact rail assembly, which supplies power to a transit vehicle. The insulator assembly further comprises an insulator anchor bolt assembly, a base shim plate, a bolt assembly, a lubricating shim, and retaining clips. The insulator anchor bolt assembly supports and restrains the contact rail assembly and insulates it from ground and structure. The lubricating shim comprises a lubricating shim top wall and lateral tabs.

The cover board assembly is manufactured from materials meeting the following requirements:
  A) Arc resistance: Minimum of 105 seconds, ASTM D 495;
  B) Dielectric strength: Short time, minimum 200 Volts per mil, ASTM D 149;
  C) Insulation resistance test: The insulation resistance between any point in contact with contact rail assembly 400 and any other point of cover board assembly 200 shall be 10,000,000 ohms minimum when measured with a 1,000-volt megohmeter;

D) Tracking resistance: Minimum 500 minutes at 2,500 volts, 60 hertz, ASTM D 2303;

E) Water absorption: 24 hours at 23'C, maximum weight increase 0.3%, ASTM D 570;

F) Flammability: Class 94V-0, UL 94 for maximum thickness of material, or 2 mm thickness, whichever is less;

G) Flame Spread Index: maximum of 25, ASTM E84;

H) Heat distortion: Minimum of 125'C at 264 psi, ASTM D 648;

I) Impact, Izod type: Minimum of 4 foot-pounds per inch, Method A, ASTM D 256;

J) Outdoor Suitability: Tensile, flexural, and Izod Impact properties shall not be less than 10% of the unconditioned value after exposure to Xenon Arc exposure in accordance with ASTM G and G 155 for a period of 1000 hours. Flammability properties shall not be reduced as a result of the UV Conditioning;

K) Color: Pantone PMS 420;

L) Flexural strength: Minimum of 12,000 psi, ASTM D 790;

M) Tensile strength: Minimum of 8,000 psi, ASTM D 638; and

N) Compressive strength: Minimum of 12,000 psi, ASTM D 695.

The supporting insulators, the support bracket assembly, the side cover board, and the top cover board are made of polycarbonate/ABS thermo plastic compound.

It is therefore one of the main objects of the present invention to provide a third rail insulating system.

It is another object of this invention to provide a third rail insulating system, which has threaded holes to receive bolts.

It is another object of this invention to provide a third rail insulating system, which has a top cover board having hexagonal cells.

It is another object of this invention to provide a third rail insulating system in which a side cover board may be positioned in a closed or in an open configuration.

It is another object of this invention to provide a third rail insulating system, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is a third rail power insulating system, and is generally referred to with numeral 10. It can be observed that it basically includes insulator assembly 20, cover board assembly 200, and contact rail assembly 400.

Figure 1:
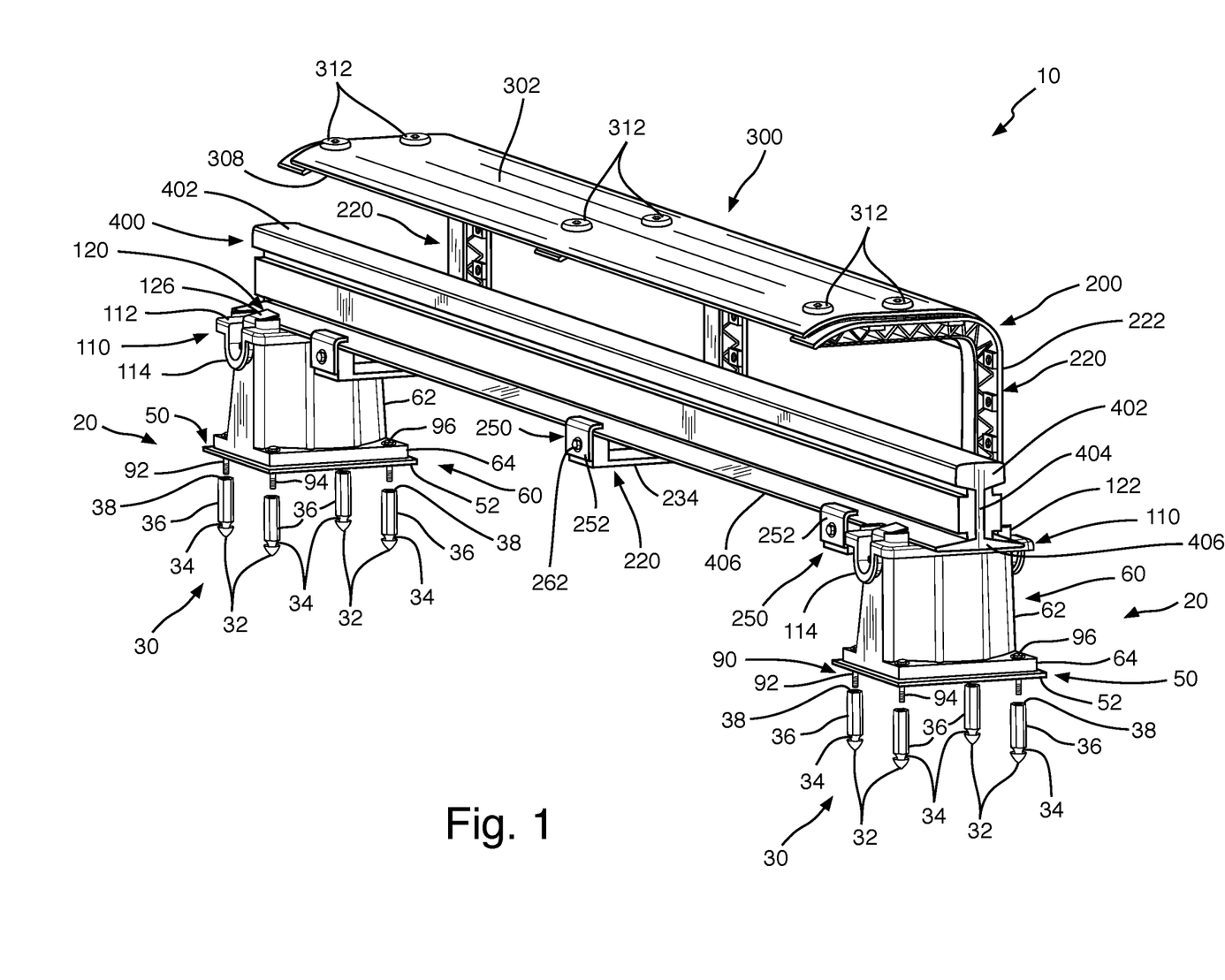
FIG. 1 represents an isometric view of the present invention.

As seen in FIG. 1, insulator assembly 20 and cover board assembly 200 are mounted onto contact rail assembly 400. Insulator assembly 20 supports contact rail assembly 400, which supplies power to a transit vehicle. Contact rail assembly 400 comprises head 402 extending from neck 404 and having base 406. Although not illustrated, contact rail assembly 400 is part of a contact rail system, which supplies power to transit vehicles. The contact rail system is an arrangement of components consisting of contact rail, splice bars and pin bolts, anchor assemblies, expansion joints, end approaches, dip rail sections, and fastening hardware. Contact rail assembly 400 is a trackside conductor consisting of steel rail with aluminum bars attached on webs that are used to transmit electrical energy from a power source to a transit vehicle via current-collector shoes. Current collector shoes are part of a current collector attached to a vehicle, which rides along the top of the contact rail. Head 402 comprises a dip rail section, not seen, defining a portion of the contact rail at an elevation below the standard elevation, which allows the current-collector shoe in its lowest position to pass over it without physical contact.

Contact rail assembly 400 also comprises an end approach section, not seen, which is a section of contact rail used at the ends to ramp the collector shoe from one elevation in full contact, to another elevation out of contact, with the contact rail, or vice versa. Furthermore, contact rail assembly 400 also comprises expansion joints, not seen, which are an assembly used in the contact rail to accommodate thermal expansion and contractions.

Insulator assembly 20 comprises insulator anchor bolt assembly 30, base shim plate 50, supporting insulator 60, bolt assembly 90, lubricating shim 110, and retaining clips 120. Insulator assembly 20 mounts upon a single molded pedestal, not seen, that is part of a track guideway.

Insulator anchor bolt assembly 30 supports and restrains contact rail assembly 400, and insulates it from ground and structure. Insulator anchor bolt assembly 30 also ties supporting insulator 60 to a concrete support pedestal. Insulator anchor bolt assembly 30 comprises head 32, neck 34, shank 36, and internal threading 38. Insulator anchor bolt assembly 30 is manufactured from materials meeting the following requirements:

A) Anchor Bolts: ¾" diameter minimum, steel structural bolts meeting the requirements of ASTM A 325, Heavy Hex, Class 2B Thread;

B) Embedded Inserts to receive Anchor Bolts: Steel meeting the requirements of ASTM A 325, Class 2B thread. That part of the embedded insert is directly in contact with concrete and shall be given a 10 mil thick coating of dry powder epoxy resin, such as "3M SCOTHKOTE 413", Nap-Grad 7-2719, or similar; and C) Washers: Steel meeting the requirements of ASTM F436 and ASTM 325.

Base plate 50 has edges 52 and serves as a shim to level supporting insulators 60 if required. Supporting insulator 60 comprises sidewall 62 and base 64.

A contact rail seat is an area defined at lubricating shim top wall 112. The contact rail seat defines a drip edge to allow water runoff and prevent a water stream from making contact onto contact rail assembly 400. It is noted that lubricating shim 110 is of a different color than supporting insulator 60 so that one may visually identify when lubricating shim 110 needs replacement due to damage or excessive wear. It provides vertical support to lubricating shim 110 and base 406 of contact rail assembly 400. The contact rail seat further provides lateral restraint against transverse movement linder operating conditions. In addition, a horizontal projection around the contact rail seat defines a drip edge that is intended to break current flow from wet surfaces in contact with an energized contact rail assembly 400 and base 64 of supporting insulator 60. Insulator assemblies 20 are manufactured from materials meeting the following requirements:

D) Arc resistance: Minimum of 105 seconds, ASTM D 495;
E) Dielectric strength: Short time, minimum 200 Volts per mil, ASTM D 149;
F) Tracking resistance: Minimum 600 minutes at 2,500 volts, 60 hertz, ASTM D 2303;
G) Water absorption: 24 hours at 23.degree. C. maximum weight increase 0.3%, ASTM D 570;
H) Flammability: Class 94V-0, UL 94 for maximum thickness of material, or 2 mm thickness, whichever is less;
I) Flame Spread Index: maximum of 25, ASTM E84;
J) Heat distortion: Minimum of 188.degree. C. at 264 psi, ASTM D 648;
K) Impact, Izod type: Minimum of 4 foot-pounds per inch, Method A, ASTM D 256;
L) Outdoor suitability: Tensile, flexural, and Izod Impact properties shall not be less than 10% of the unconditioned value after exposure to Xenon Arc exposure in accordance with ASTM G and GI 55 for a period of 1000 hours, whereas flammability properties shall not be reduced as a result of the UV Conditioning;
M) Color: Pantone PMS 420;
N) Flexural strength: Minimum of 25,000 psi, ASTM D 790;
O) Tensile strength: Minimum of 12,000 psi, ASTM D 638; and
P) Compressive strength: Minimum of 20,000 psi, ASTM D 695.

In the preferred embodiment, bolt assembly 90 comprises four bolts, each having shank 92, threads 94, and head 96. Bolt assembly 90 is made of structural steel meeting the requirements of ASTM A325 Alloy Group 2.

Lubricating shim 110 is a copolymer shim located on top of supporting insulator 60 to provide reduced friction resistance of longitudinal contact rail movement due to thermal expansion and contraction. Lubricating shim 110 comprises lubricating shim top wall 112 and lateral tabs 114. The lubricating shim top wall defines a contact rail seat. The contact rail seat defines a drip edge to allow water runoff and prevent a water stream from making contact onto contact rail assembly 400.

In the preferred embodiment, lubricating shim 110 is manufactured from materials meeting the following requirements:

Q) Tensile strength: Minimum of 8,000 psi at 70'C, ASTM D 638;
R) Ultimate elongation: Minimum of 10%, ASTM D 638;
S) Compressive strength at 1% deflection: Minimum of 3,500 psi, ASTM D 695;
T) Water absorption: Maximum weight increase 0.5% after 24 hours, ASTM D 570;
U) Deflection temperature: Minimum of 110' at 264 psi, ASTM D 648;
V) Arc resistance: Minimum of 105 seconds, ASTM D 495; and
W) Static coefficient of friction against polished metal: 0.20, maximum.

Retaining clips 120 restrain uplift of the contact rail under design requirements for extreme wind load and short circuit conditions. Each retaining clip 120 comprises member 122 and arms 126. In the preferred embodiment, retaining clips 120 are made of stainless steel and meet requirements of ASTM A276, Alloy Type 316.

Figure 2:
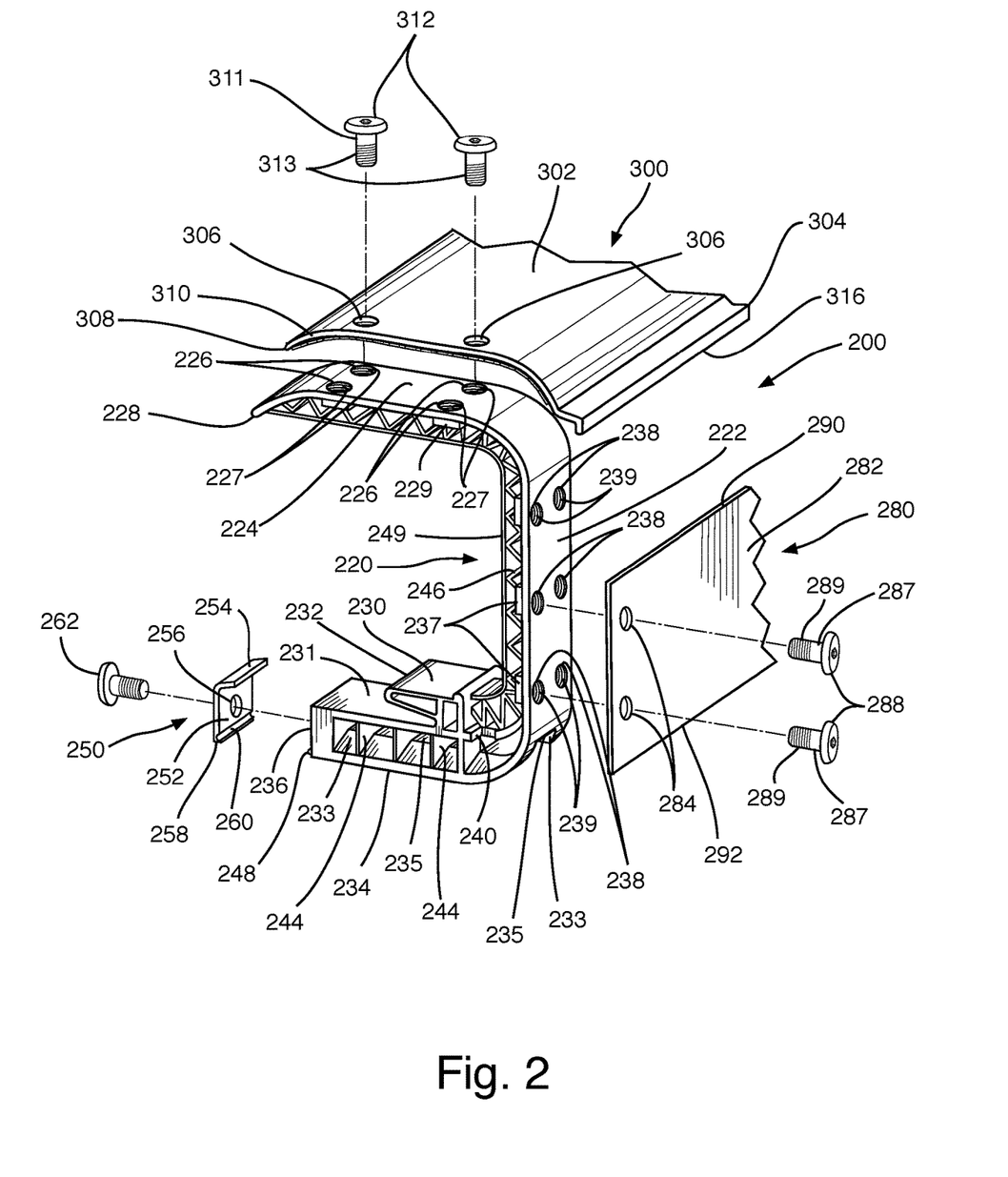
FIG. 2 is an exploded view of a cover board assembly of the present invention.

As seen in FIG. 2, cover board assembly 200 comprises support bracket assembly 220, cover board assembly retaining clips 250, side cover board 280, and top cover board 300.

Support bracket assembly 220 comprises lateral wall 222, top wall 224, at least two pairs of top bracket holes 226 with respective top threads 227, top bolt supports 229, at least three pairs of lateral bracket holes 238 with respective lateral threads 239, lateral bolt supports 237, internal walls 244, internal reinforcement walls 246, and central wall 249. Cover board assembly retaining clips comprises wall 252, arm 254, through hole 256, channel 258, edge 260, and bolt 262.

Side cover board 280 comprises plate 282, first and second lateral holes 284, and first and second lateral bolts 288. Plate 282 has plate top edge 290 and plate bottom edge 292. Side cover board 280 and top cover board 300 are mounted onto support bracket assembly 220, whereby first and second lateral bolts 288 pass through first and second lateral holes 284 to be threaded into respective lateral threads 239, and first and second top bolts 312 pass through first and second top holes 306 to be threaded into top threads 227.

Figure 3:
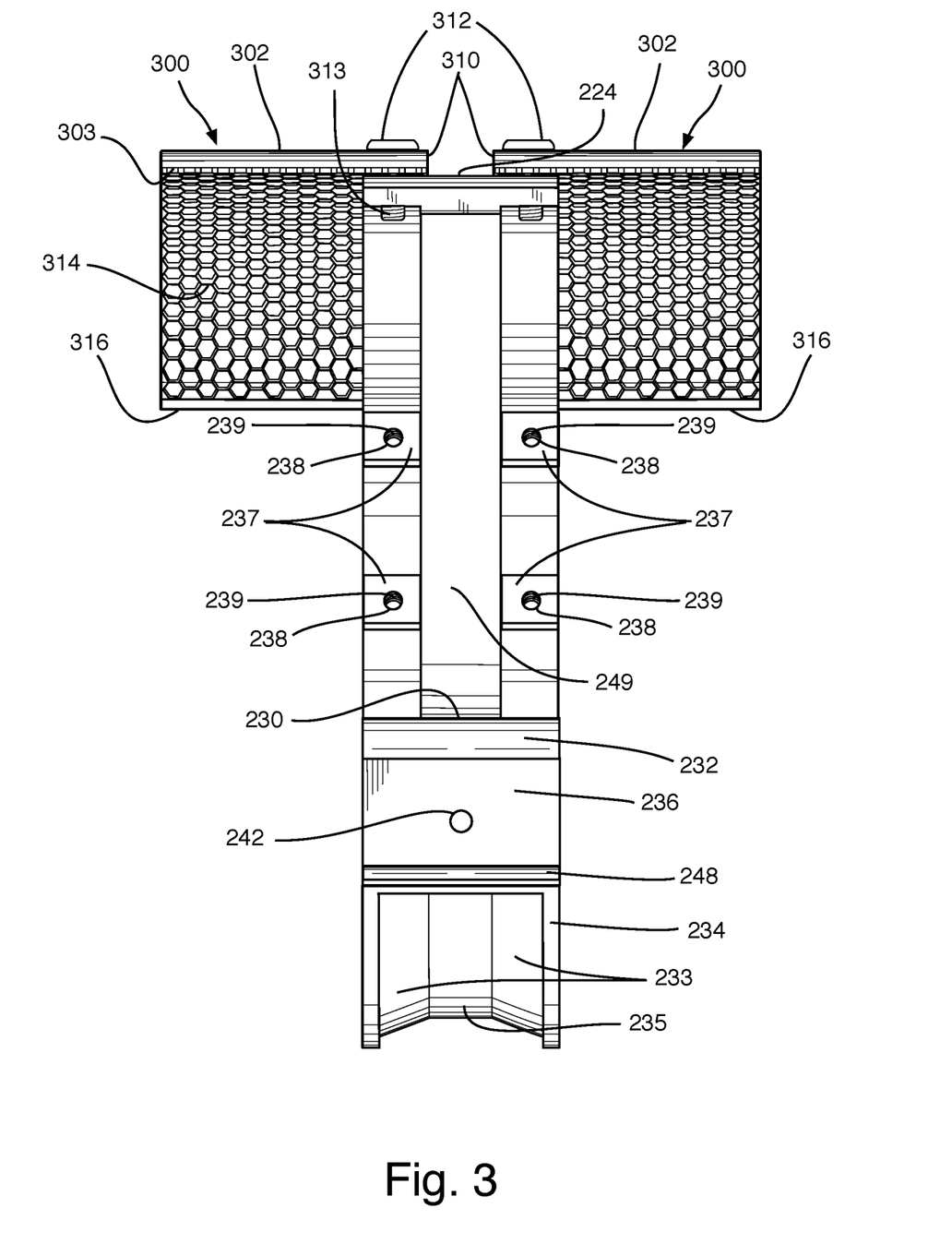
FIG. 3 is a bottom view of a support bracket assembly with top cover boards mounted.

As seen in FIGS. 2 and 3, top cover board 300 comprises elongated plate 302, bottom face 303 having hexagonal cells 314, first and second top holes 306, first and second top bolts 312, and an elongated lip 316. Top cover board 300 further comprises lateral edges 304 and 308, and edge 310.

As also seen in FIGS. 2 and 3, each top bolt support 229 and each lateral bolt support 237 is positioned around respective top bracket hole 226 and respective lateral bracket hole 238, whereby top brackets holes 226 and lateral bracket holes 238 extend through top bolt supports 229 and lateral bolt supports 237 respectively. Top bolt supports 229 are positioned at an inner side of top wall 224, and lateral bolt supports 237 are positioned at an inner side of lateral wall 222. Top bolt supports 229 and lateral bolt supports 237 provide an additional surface to secure top bolts 312 and lateral bolts 288 on support bracket assembly 220.

Hexagonal cells 314 extend over a complete area of bottom face 303. Base wall 234 comprises lateral base walls 233 and central base wall 235 between lateral base walls 233.

Support bracket assembly 220 has a general C-shape and further comprises upper end 228, protrusion 230, protrusion end 232, lower end 236, and at least one cutout 240 defining a channel to allow a second water runoff and prevent a second water stream from making contact onto the contact rail assembly.

Lower end 236 comprises end hole 242 and lip 248. Cover board assembly retaining clip 250 is mounted onto lower end 236, whereby channel 258 receives lip 248, and bolt 262 passes across through hole 256 to be threaded into end hole 242.

Top cover board 300 comprises elongated plate 302 having sufficient curvature to contour the upper portion of support bracket assembly 220.

First and second top bolts 312 each comprise plain portion and threaded portion 313. In use, plain portion 311 remains inside respective first and second top holes 306, and respective top threads 227 receive threaded portions 313.

First and second lateral bolts 288 each comprise plain portion and threaded portion 289. In use, plain portion 287 remains inside respective first and second lateral holes 284, and respective lateral threads 239 receive threaded portions 289.

Figures 4A, 4B:
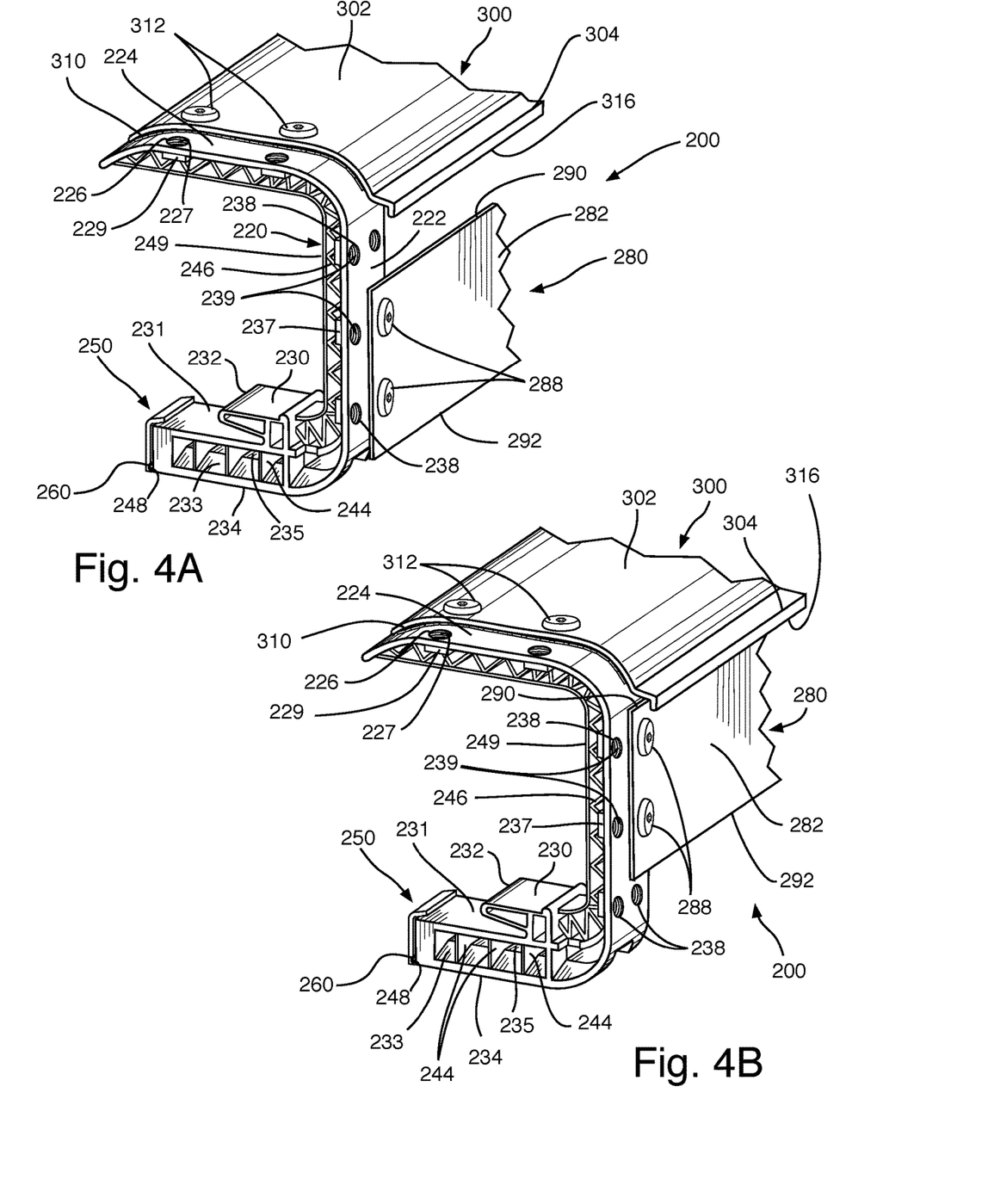
FIG. 4A is the cover board assembly in an open configuration.
FIG. 4B is the cover board assembly in a closed configuration.

As seen in FIGS. 4A and 4B, plate 282 is mounted to lateral wall 222 wherein first and second lateral bolts 288 are positioned onto two lower lateral bracket holes 238, whereby a cavity is defined between top cover board 300 and side cover board 280 defining an open configuration of cover board assembly 200.

In another embodiment, plate 282 is mounted onto lateral wall wherein first and second lateral bolts 288 are positioned onto two upper lateral bracket holes 238, whereby elongated lip 316 relatively mounts over plate top edge 290 defining a closed configuration of cover board assembly 200.

Internal reinforcement walls 246 extend from central wall 249 to respective lateral wall 222 and top wall 224. Internal reinforcement walls 246 are in a zigzag configuration. Internal walls 244 extend from base top face 231 to base wall 234. Internal walls are perpendicular to base wall 234 and base top face 231.

Support bracket assembly 220, side cover board 280, and top cover board 300 are made of polycarbonate/ABS thermo plastic compound.

In the preferred embodiment, cover board assembly 200 is manufactured from materials meeting the following requirements:

X) Arc resistance: Minimum of 105 seconds, ASTM D 495;
Y) Dielectric strength: Short time, minimum 200 Volts per mil, ASTM D 149;
Z) Insulation resistance test: The insulation resistance between any point in contact with contact rail assembly 400 and any other point of cover board assembly 200 shall be 10,000,000 ohms minimum when measured with a 1,000-volt megohmeter;
AA) Tracking resistance: Minimum 500 minutes at 2,500 volts, 60 hertz, ASTM D 2303;
AB) Water absorption: 24 hours at 23'C, maximum weight increase 0.3%, ASTM D 570;
AC) Flammability: Class 94V-0, UL 94 for maximum thickness of material, or 2 mm thickness, whichever is less;
AD) Flame Spread Index: maximum of 25, ASTM E84;
AE) Heat distortion: Minimum of 125'C at 264 psi, ASTM D 648;
AF) Impact, Izod type: Minimum of 4 foot-pounds per inch, Method A, ASTM D 256;
AG) Outdoor Suitability: Tensile, flexural, and Izod Impact properties shall not be less than 10% of the unconditioned value after exposure to Xenon Arc exposure in accordance with ASTM G and G 155 for a period of 1000 hours. Flammability properties shall not be reduced as a result of the UV Conditioning;
AH) Color: Pantone PMS 420;
AI) Flexural strength: Minimum of 12,000 psi, ASTM D 790;
AJ) Tensile strength: Minimum of 8,000 psi, ASTM D 638; and
AK) Compressive strength: Minimum of 12,000 psi, ASTM D 695.

As an example, present invention 10 can be implemented onto the Miami-Dade County, Fla. elevated rapid transit system. Such a system is subject to extreme ultraviolet light exposures, thermal variations, and extreme wind load conditions. However, present invention 10 is suitable for operation in those types of specified environmental conditions. Present invention 10 is completely operable with vehicle mounted current collector speeds of 0 to 80 miles per hour, and in an environment containing contaminants normally found in electrified railway operations, including oils, metallic dust from wheels, rails and brake shoes, and dirt and mud from wheel splash. The contact rail is typically subjected to localized thermal variations from 25.degree. F. to 190.degree. F.

Cover board assembly 200 is manufactured of a nonconductive, fire resisting material such as polycarbonate/ABS thermo plastic compound. All of cover board assembly 200 shall be of the same material. The material shall not separate, warp, buckle or sag under any environmental and operating conditions. Cover board assembly 200 resists sagging under their own weight, and shall not rattle when subjected to air turbulence due to wind conditions and passing vehicles. Cover board assembly 200 allows ready removal and replacement without disassembly of support bracket assemblies 220. All fasteners required to hold cover board assembly 200 in place are reusable and easily removable. Cover board assembly 200 is capable of being installed and maintained with standard hand tools, such as an Allen wrench. Cover board assembly 200 is detailed to provide a direct flow of water separation between each top cover board 300 and each support bracket assembly 220 connection to contact rail assembly 400.

Support bracket assembly 220 is manufactured of a nonconductive, fire resisting material meeting the material property requirements of each insulator assembly 20. All support bracket assemblies 220 shall be of the same material. Support bracket assemblies 220 are clamped directly onto contact rail assembly 400. Support bracket assemblies 220 shall not encroach into a clearance envelope. Two types of support bracket assemblies 220 shall be furnished; standard fixed-height brackets and vertically adjustable brackets for implementation at dip rail sections. The vertically adjustable brackets shall have a range of height adjustment of approximately 2" in increments of ½". Cover board assembly 200 at dip rail sections shall be maintained at the specified height above the top of contact rail assembly 400 by using the vertically adjustable support brackets. If bolts 262 are made of steel and if used to clamp support bracket assemblies 220 to contact rail assembly 400, they shall not be in direct contact with contact rail assembly 400.

Cover board assembly 200 shall be designed, fabricated, and tested to provide protection from electrical hazard. If stepped on, midway between support bracket assemblies 220, by a person weighing 250 lbs. plus impact, cover board assembly 200 may deflect a maximum of 2", but shall not split, crack, or break, and shall return to its original shape and position when the weight is removed. Maximum deflection of cover board assembly 200 under its own weight shall be ⅛" between support bracket assemblies 220.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A third rail power insulating system comprising a cover board assembly, said cover board assembly comprises:
   A) a support bracket assembly comprising a top wall, at least two pairs of top bracket holes with top threads, top bolt supports, a lateral wall, at least three pairs of lateral bracket holes with lateral threads, lateral bolt supports, internal walls, internal reinforcement walls, and a central wall;
   B) cover board assembly retaining clips comprising a wall, an arm, a through hole, a channel, an edge, and a bolt;
   C) a side cover board comprising a plate having a plate top edge and a plate bottom edge, first and second lateral holes, and first and second lateral bolts; and
   D) a top cover board comprising an elongated plate, a bottom face having hexagonal cells, first and second top holes, first and second top bolts, and an elongated lip, said side cover board and said top cover board are mounted onto said support bracket assembly, whereby said first and second lateral bolts pass through said first and second lateral holes to be threaded into said respective lateral threads, and said first and second top bolts pass through said first and second top holes to be threaded into said top threads, said cover board assembly is mounted onto a contact rail assembly.

2. The third rail power insulating system set forth in claim 1, wherein each of said top bolt support and each of said lateral bolt support is positioned around respective said top bracket hole and respective said lateral bracket hole, whereby said top bracket holes and said lateral bracket holes extend through said top bolt supports and said lateral bolt supports respectively.

3. The third rail power insulating system set forth in claim 1, wherein said top bolt supports and said lateral bolt supports are positioned at an inner side of said top wall and an inner side of said lateral wall respectively.

4. The third rail power insulating system set forth in claim 1, wherein said internal reinforcement walls extend from said central wall to respective said lateral wall or said top wall, whereby said internal reinforcement walls are in a zigzag configuration.

5. The third rail power insulating system set forth in claim 1, wherein said internal walls extend from a base wall to a base top face, whereby said internal walls are perpendicular to said base wall and said base top face.

6. The third rail power insulating system set forth in claim 1, wherein said first and second top bolts each comprise a plain portion and a threaded portion whereby said plain portion remains inside respective said first and second top holes, and said threaded portion is received by respective said top threads.

7. The third rail power insulating system set forth in claim 1, wherein said first and second lateral bolts each comprise a plain portion and a threaded portion, whereby said plain portion remains inside respective said first and second lateral holes, and said threaded portion is received by respective said lateral threads.

8. The third rail power insulating system set forth in claim 1, wherein said plate is mounted to said lateral wall wherein said first and second lateral bolts are positioned onto the two upper lateral bracket holes, whereby said elongated lip relatively mounts onto said plate top edge defining a closed configuration of said cover board assembly.

9. The third rail power insulating system set forth in claim 1, wherein said plate is mounted to said lateral wall wherein said first and second lateral bolts are positioned onto two lower of said lateral bracket holes, whereby a cavity is defined between said top cover board and said side cover board defining an open configuration of said cover board assembly.

10. The third rail power insulating system set forth in claim 1, wherein said hexagonal cells extend over a complete area of said bottom face.

11. The third rail power insulating system set forth in claim 5, wherein said base wall comprises lateral base walls and a central base wall between said lateral base walls.

12. The third rail power insulating system set forth in claim 1, wherein said support bracket assembly has a general C-shape.

13. The third rail power insulating system set forth in claim 1, wherein said support bracket assembly further comprises an upper end, a lower end, a protrusion, a protrusion end, and at least one cutout defining a channel to allow a water runoff and prevent a water stream from making contact onto said contact rail assembly.

14. The third rail power insulating system set forth in claim 13, wherein said lower end comprises an end hole and a lip.

15. The third rail power insulating system set forth in claim 14, further characterized in that said cover board assembly retaining clip is mounted onto said lower end, whereby said channel receives said lip, and said bolt passes through said through hole to be threaded into said end hole.

16. The third rail power insulating system set forth in claim 1, wherein said elongated plate comprises sufficient curvature to contour an upper portion of said support bracket assembly.

17. The third rail power insulating system set forth in claim 1, further comprising an insulator assembly comprising supporting insulators, said insulator assembly is mounted onto a single molded pedestal that is part of a track guideway, said insulator assembly supports said contact rail assembly, which supplies power to a transit vehicle, said insulator assembly further comprises an insulator anchor bolt assembly, a base shim plate, a bolt assembly, a lubricating shim, and retaining clips, said insulator anchor bolt assembly supports and restrains said contact rail assembly and insulates it from ground and structure, said lubricating shim comprises a lubricating shim top wall and lateral tabs.

18. The third rail power insulating system set forth in claim 1, further characterized in that said cover board assembly is manufactured from materials meeting the following requirements:
   E) Arc resistance: Minimum of 105 seconds, ASTM D 495;
   F) Dielectric strength: Short time, minimum 200 Volts per mil, ASTM D 149;
   G) Insulation resistance test: The insulation resistance between any point in contact with contact rail assembly 400 and any other point of cover board assembly 200 shall be 10,000,000 ohms minimum when measured with a 1,000-volt megohmeter;
   H) Tracking resistance: Minimum 500 minutes at 2,500 volts, hertz, ASTM D 2303;
   I) Water absorption: 24 hours at 23'C, maximum weight increase 0.3%, ASTM D 570;
   J) Flammability: Class 94V-0, UL 94 for maximum thickness of material, or 2 mm thickness, whichever is less; and
   K) Flame Spread Index: maximum of 25, ASTM E84.

19. The third rail power insulating system set forth in claim 18, further characterized in that said cover board assembly is manufactured from materials meeting the following requirements:

- L) Heat distortion: Minimum of 125'C at 264 psi, ASTM D 648;
- M) Impact, Izod type: Minimum of 4 foot-pounds per inch, Method A, ASTM D 256;
- N) Outdoor Suitability: Tensile, flexural, and Izod Impact properties shall not be less than 10% of the unconditioned value after exposure to Xenon Arc exposure in accordance with ASTM G 151 and G 155 for a period of 1000 hours. Flammability properties shall not be reduced as a result of the UV Conditioning;
- O) Color: Pantone PMS 420;
- P) Flexural strength: Minimum of 12,000 psi, ASTM D 790;
- Q) Tensile strength: Minimum of 8,000 psi, ASTM D 638; and
- R) Compressive strength: Minimum of 12,000 psi, ASTM D 695.

20. The third rail power insulating system set forth in claim 1, wherein said support bracket assembly, said side cover board, and said top cover board are made of polycarbonate/ABS thermo plastic compound.

* * * * *